United States Patent [19]

Benker et al.

[11] Patent Number: 5,138,371

[45] Date of Patent: Aug. 11, 1992

[54] APPARATUS FOR MANIPULATING ROLL FILMS IN COPYING MACHINES

[75] Inventors: Gerhard Benker, Pullach; Reinhard Nicko; Bernd Payrhammer, both of Munich; Manfred Schlechte, Neuried, all of Fed. Rep. of Germany

[73] Assignee: AGFA-Gevaret Aktiengesellschaft, Leverkusen, Fed. Rep. of Germany

[21] Appl. No.: 366,145

[22] Filed: Jun. 14, 1989

[30] Foreign Application Priority Data

Jul. 7, 1988 [DE] Fed. Rep. of Germany ....... 3823076

[51] Int. Cl.⁵ .............................................. G03B 27/58
[52] U.S. Cl. ...................................................... 355/72
[58] Field of Search ................ 355/72, 28, 27, 54; 352/159

[56] References Cited

U.S. PATENT DOCUMENTS

3,874,791  4/1975  Thieme et al. ......................... 355/41
4,627,719  12/1986  Nitsch et al. ......................... 355/54
4,757,353  7/1988  Kitai et al. ............................ 355/54

Primary Examiner—Michael L. Gellner
Assistant Examiner—D. Rutledge

[57] ABSTRACT

Apparatus for advancing roll films in a copying machine on a table which is located above the floor at a level less than the length of a film. The apparatus has a film channel and advancing rolls which can engage one end portion of a film to advance the film past a monitoring device preparatory to copying and/or past a copier subsequent to monitoring. The other end portion of the film is frictionally or clampingly held in a recess or on a supporting surface adjacent the inlet of the film channel so that the median portion of the film forms a loop which does not reach the floor beneath the table. A wiping device with two brushes can be installed adjacent the recess to wipe both sides of the film while the film advances into the channel so that the size of its looped portion is reduced.

21 Claims, 3 Drawing Sheets

APPARATUS FOR MANIPULATING ROLL FILMS IN COPYING MACHINES

BACKGROUND OF THE INVENTION

The invention relates to apparatus for manipulating elongated webs of flexible material, such as exposed and developed photographic roll films which are ready for copying.

A copying machine in which the apparatus of the present invention can be put to use is disclosed in commonly owned U.S. Pat. No. 4,627,719 to Nitsch et al. The patented copying machine is provided with a first magazine which can receive a roll of convoluted photographic film, and a film channel which can receive the leader of the convoluted film. A transporting mechanism is used to advance the film in stepwise fashion through the channel and into a second magazine wherein the film is convoluted to form a second roll. The film is monitored during transport from the first toward the second magazine, and successive frames of the film are copied during transport from the second magazine back into the first magazine. The copying operation is carried out in dependency on the results of the monitoring operation.

Insertion of the film into the first magazine takes up a substantial amount of time because the film must be convoluted to form a roll which can fit into the magazine. The convoluting operation is carried out by hand, and the person in charge must be careful not to scratch or otherwise damage the film.

In accordance with another prior proposal, the leader of the film is introduced into the channel and the film is permitted to hand ahead of the inlet to the channel. In other words, the first magazine is omitted. This simplifies the task of introducing the leader of the film into the channel and renders it possible to dispense with the step of convoluting the film. However, the table on which the channel is mounted in normally approximately 80 cm above the floor level. On the other hand, the length of a standard No. 135 film (35 mm wide with perforations along both marginal portions and with 36 film frames) is approximately 150 cm. Therefore, a portion of the film which simply hangs down in front of the channel slides along the floor and is likely to be contaminated and/or otherwise adversely affected prior to monitoring and subsequent copying.

OBJECTS OF THE INVENTION

An object of the invention is to provide an apparatus which simplifies the manipulation of elongated webs of flexible material, particularly exposed and developed photographic roll films.

Another object of the invention is to provide an apparatus which reduces the likelihood of damage to the web during manipulation in or adjacent a copying, monitoring or like station.

A further object of the invention is to provide a simple, compact and inexpensive apparatus which can be installed in or combined with existing photographic copying machines to facilitate manipulation of photographic roll films preparatory to and/or subsequent to copying of the images of film frames.

An additional object of the invention is to provide an apparatus which can reliably maintain full-length photographic roll films above the floor level and which can be manipulated by persons having little or no technical background.

Still another object of the invention is to provide a novel and improved method of manipulating photographic roll films immediately prior or subsequent to the making of images of film frames.

A further object of the invention is to provide the apparatus with novel and improved means for releasably holding photographic roll films in or adjacent a copying machine.

Another object of the invention is to provide the apparatus with novel and improved means for automatically cleaning films during transport toward or away from the copying station.

SUMMARY OF THE INVENTION

One feature of the present invention resides in the provision of an apparatus for manipulating a web which consists of a finite length of flexible material, such as a photographic roll film in a copying machine. The apparatus comprises a film channel having an inlet and including means for frictionally holding the web on introduction of one end portion of the web into the channel by way of the inlet, means for supporting the web adjacent the inlet, means for releasably clamping the web to the supporting means, and means for transporting the web longitudinally including means for looping the web between the inlet and the other end portion of the web. The clamping means can include a lever and means for pivoting the lever into and from engagement with the web on the supporting means.

In accordance with a presently preferred embodiment, the supporting means (e.g., the top of a table or desk) has a first surface which cooperates with the clamping means to grip the web adjacent the inlet, and a downwardly extending second surface which is adjacent the first surface and faces away from the inlet to provide room for the formation of a downwardly hanging loop in response to transport of the one end portion of the web in the channel toward the inlet so that a progressively increasing loop is formed between the inlet and the other end portion of the web.

The transporting means can comprise advancing rolls which define a nip for the web in the channel, and such advancing rolls are preferably installed (e.g., in the channel) adjacent the inlet.

The clamping means can be mounted for movement away from the supporting means to provide room for manual placing of the web (particularly the other end portion of the web) onto the supporting means.

The transporting means is preferably designed to advance the web in the channel toward or away from the inlet, and the apparatus (or the machine in which the apparatus is installed) can be further provided with means for monitoring the web during advancement of the one end portion away from the inlet, and means for imaging the web onto photographic paper or the like during advancement of the one end portion of the web toward the inlet. The means for transporting the web can be designed in such a way that the one end portion of the web is advanced in a direction toward the inlet in stepwise fashion.

The lever of the clamping means is preferably pivotable about an axis which is located at a level below the first surface of the supporting means. A portion of the lever is arranged to overlie and to bear against the web on the first surface. Such first surface is or can be horizontal or nearly horizontal. The lever is preferably pivotable between a first position in which its aforementioned portion engages the web on the supporting means, and a second position in which the aforementioned portion of the lever is located at a level above the inlet of the channel. The means for pivoting the lever between the first and second positions can comprise an electric, a pneumatic or any other suitable motor.

The apparatus preferably further comprises a photocell or other suitable means for monitoring the channel for the presence and absence of the web in the channel adjacent the inlet. Such monitoring means can include means for initiating the movement of the lever to the second position by way of the pivoting means in response to insertion of the one end portion of the web into the channel by way of the inlet, and for effecting a movement of the lever to the first position by way of the pivoting means in response to withdrawal of the web from the channel by way of the inlet (such withdrawal can be complete or partial).

The apparatus can further comprise web cleaning means including a web cleaning element which is provided on the clamping means and serves to wipe one side of the web in response to advancement of the web into the channel and the resulting sliding movement of looped portion of the web between the clamping means and the supporting means. The cleaning means preferably further includes a second cleaning element which is provided on the supporting means opposite the cleaning element on the clamping means to wipe the other side of the web in response to advancement of the web into the channel. At least one of the cleaning elements can include or constitute a brush.

The apparatus can further comprise a gripping device having means for receiving the other end portion of the web so that the web extends from the receiving means, between the supporting and clamping means, and into the inlet of the channel. In other words, the web is wiped clean between its two end portions while the advancing means is operated to move the web into the channel so that the web is compelled to slide between the clamping and supporting means and the size of the looped web portion between the receiving means and the supporting means is in the process of being reduced. The receiving means can include a recess for the other end portion of the web, and means for frictionally engaging the other end portion of the web in the recess with a force which can be overcome by the transporting means in response to exertion of a pull upon the one end portion of the web or upon an intermediate portion of the web in a direction to advance the other end portion toward the clamping means subsequent to introduction of previously looped portion of the web into the channel.

The means for frictionally engaging the other end portion of the web in the recess can exert a force which suffices to ensure that the weight of looped portion of the web cannot entail extraction of the other end portion from the recess. The means for frictionally engaging can consist of or can contain rubber or another material having a high coefficient of friction so that the other end portion of the web can be reliably held in the recess until and unless the operator decides that the other end portion should be extracted or until and unless the transporting means is operated in a direction to extract the other end portion of the web from the recess subsequent to introduction of the major portion of the web into the channel.

Another feature of the invention resides in the provision of a method of manipulating a web of flexible material, particularly a web of photographic roll film of finite length, i.e., a web having first and second end portions. The method comprises the steps of releasably holding one end portion of the web, moving the other end portion of the web close to the one end portion so that the web is looped between the two end portions, and advancing the first end portion of the web in a direction away from the second end portion to thus reduce the size of the looped portion between the two end portions. The method can further comprise the step of wiping and/or otherwise cleaning at least one side of the web between the two end portions during reduction of the size of looped portion of the web. Still further, the method can comprise the step of advancing the first end portion of the web in a direction toward the second end portion to thus increase the size of the looped portion. Such method can further comprise the steps of monitoring the web between the first and second end portions in the course of one of the advancing steps, and copying the web between the first and second end portions of the web in the course of the other advancing step.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF PREFERRED EMBODIMENTS

Figure 1:
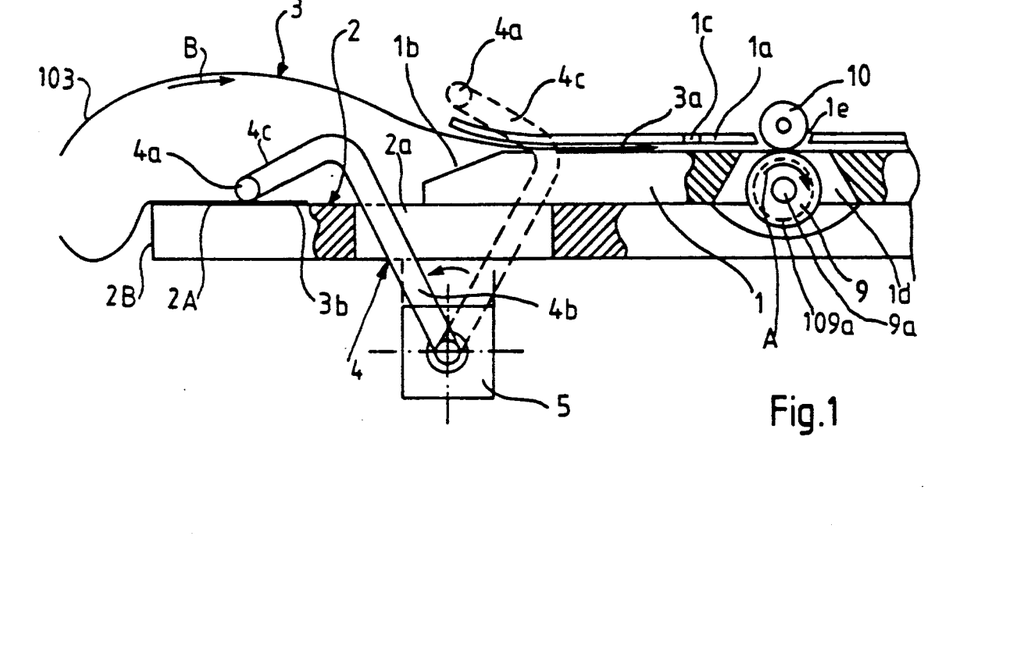
FIG. 1 is a fragmentary schematic partly elevational and partly longitudinal vertical sectional view of an apparatus which embodies one form of the invention and is designed to clamp one end portion of the web, the web being shown at that stage of manipulation when the other end portion is received in the channel and the median portion of the web forms a loop which is being reduced as a result of transport of the web into the channel.
Figure 2:
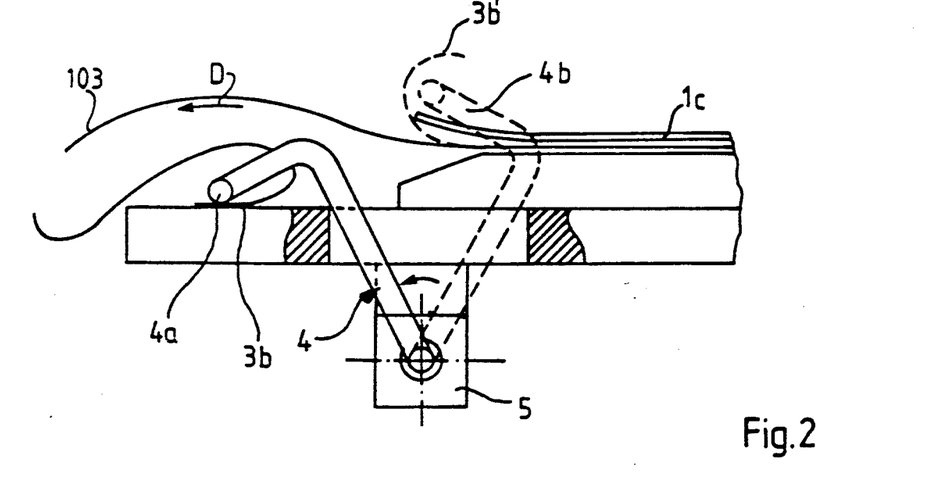
FIG. 2 shows the structure of FIG. 1, with the one end portion of the web clamped in a manner as presently preferred during transport of the web out of the channel so that the size of the looped median portion of the web is on the increase.
Figure 3:
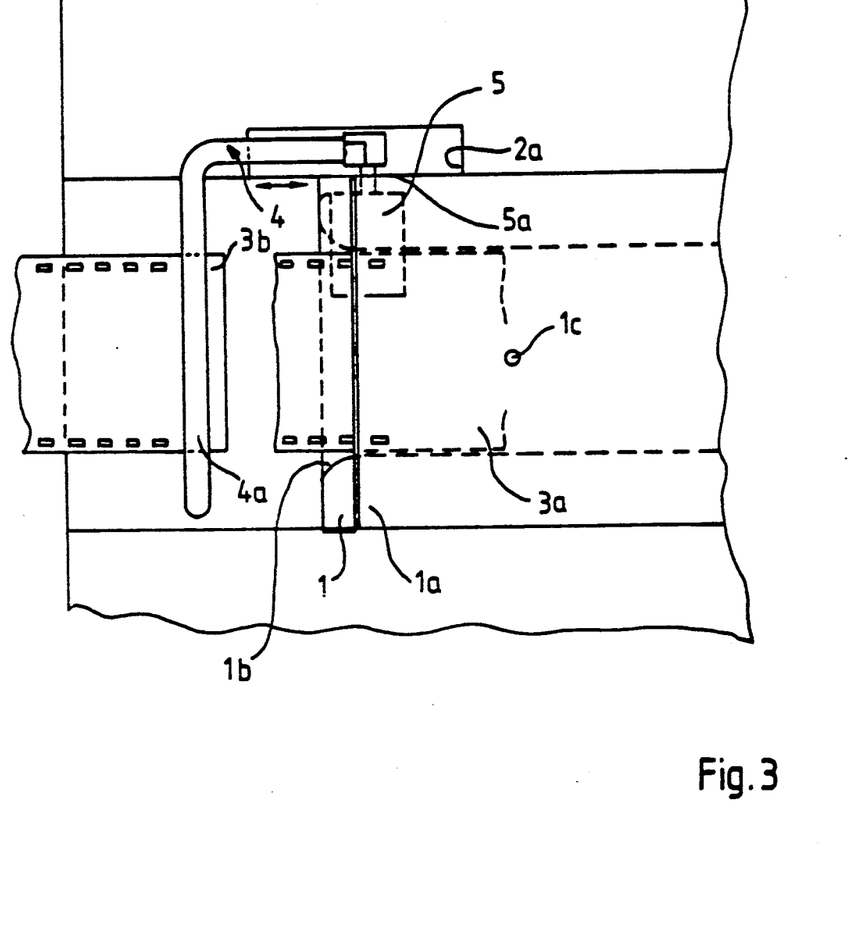
FIG. 3 is a plan view of a portion of the apparatus which is shown in FIGS. 1 and 2.

Referring first to FIGS. 1 to 3, there is shown an apparatus which includes a film channel including a lower section 1 and an upper section or cover 1a defining with the lower section 1 a passage for a web 3 which is an exposed and developed photographic roll film having a first end portion 3a and a second end portion 3b. The height of the passage for the film 3 is selected in such a way that the surfaces flanking the passage from above and below serve as a means for frictionally holding the leader 3a of the film in the position of FIG. 1 or for frictionally holding a median portion of the film in the position of FIG. 2. The lefthand end portion of the cover 1a diverges upwardly from the adjacent portion of the lower section 1 so that the channel defines an inlet 1b which is designed to facilitate introduction of the end portion 3a into the passage between the parallel parts of the section 1 and cover 1a.

The cover 1a has an aperture 1c which is located slightly to the right of the inlet 1a and is adjacent the path of a beam of radiation issuing from a source 8a forming part of a reflection type photocell 8 (FIGS. 4 and 4a) which further includes a transducer 8b. The photocell 8 is mounted in the section 1 in such a way that the beam of radiation issuing from the source 8a impinges upon the transducer 8b so that the latter generates a signal denoting the presence of film 3 in the passage of the channel beneath the aperture 1c when the film extends from the inlet 1b toward and beyond the aperture 1c. When no film is present in the channel 1, 1a below the aperture 1c, the beam of radiation passes through the aperture 1c and the signal (e.g., no signal) which is then generated by the transducer 8b denotes that the corresponding portion of the channel does not contain a film. A suitable photocell is disclosed, for example, in German Pat. No. 22 46 066 or corresponding U.S. Pat. No. 3,874,791.

The section 1 and cover 1a of the channel are further provided with windows 1d, 1e for portions of two advancing rolls 9, 10 at least one of which can be driven in a clockwise or counterclockwise direction to transport successive increments of the film 3 in the channel toward or away from the inlet 1a. The shaft 9a of the advancing roll 9 can be said to form part of means for rotating the roll 9 clockwise or counterclockwise. The rolls 9 and 10 define a nip at or close to the level of film 3 in the passage of the channel 1, 1a. When the shaft 9a drives the roll 9 in a clockwise direction (arrow A in FIG. 1), the film 3 is caused to advance in the direction of arrow B. When the direction of rotation of the shaft 9a is reversed, the rolls 9, 10 are caused to advance the film in the direction of arrow D (FIG. 2).

The photocell 8 beneath the aperture 1c of the cover 1a generates a signal when the leader (end portion 3a) of the film 3 is introduced into and advances beyond the inlet 1b so that it seals the radiation source 8a from the aperture 1c. At such time, the transducer 8b generates a signal which starts the motor 109a for the shaft 9a without any or with a certain delay so that the film 3 begins to move in the direction of arrow B as soon as its end portion or leader 3a enters the nip of the rolls 9, 10. The motor 109a for the shaft 9a can drive the rolls 9, 10 (the roll 10 is driven by the roll 9 or by the film 3 in the nip of these rolls) continuously or in stepwise fashion.

The channel including the section 1 and the cover 1a can form part of a copying machine, e.g., a machine of the type disclosed in commonly owned U.S. Pat. No. 4,627,719 to Nitsch et al. The disclosure of this patent is incorporated herein by reference. For example, the channel can replace the magazine at one side of the copying station in the patented machine. The arrangement is such that successive frames of the film 3 are monitored during transport through the channel 1, 1a in the direction of arrow B, and the results of the monitoring operation are stored so that they can be used to influence the imaging of successive film frames onto a web of photographic paper or the like when the film is thereupon transported in the opposite direction (arrow D in FIG. 2), preferably in stepwise fashion. Thus, the apparatus of FIGS. 1 to 3 can be used to replace one of the two magazines in the machine of Nitsch et al. If it is desired to discard both magazines, the machine of Nitsch et al. is equipped with two apparatus of the type shown in FIGS. 1 to 3, one at each side of the copying station.

It is also possible to employ the apparatus of FIGS. 1 to 3 in a machine wherein a photographic roll film is advanced through the channel 1, 1a in order to move successive film frames past a monitoring station where the film is scanned for the presence or absence of frame lines between neighboring frames. The positions of frame lines are detected and the corresponding information is memorized for comparison with information denoting the desired or optimum positions and widths of frame lines. This can be achieved by ascertaining and comparing the length of film frames on the film which is transported in the channel. Once the transport of entire film in one direction (arrow B or D) is completed, the film is transported in the opposite direction (arrow D or B) and is provided with indicia (e.g., in the form of notches in one or both marginal portions of the film) which are indicative of monitored positions of the film frames.

The apparatus of FIGS. 1 to 3 further comprises a supporting means in the form of a platform 2 here shown as a carrier of lower section 1 of the channel and having a horizontal or nearly horizontal first or upper surface 2A adjacent a vertical (downwardly sloping) second surface 2B which faces away from the inlet 1b of the channel and provides ample room for the formation of a loop 103 constituting the median portion between the end portions 3a and 3b of the film. The surface 2A constitutes a supporting surface for the end portion 3b and cooperates with a clamping device 4 to frictionally engage and hold the end portion 3b with a force which suffices to ensure that the loop 103 cannot reach the floor even if the film 3 has a length of 150 cm (i.e., a length corresponding to that of a 36 mm photographic roll film having a maximum number (36) of film frames). As a rule, the surface 2A is located at approximately 80 cm above the floor level so that even a full-length roll film which is looped between the supporting surface 2A and the inlet 1b of the channel 1, 1a cannot reach the floor while it hangs freely along and downwardly beyond the surface 2B of the platform 2. In FIG. 1, the median portion or loop 103 of the film 3 is broken away. If this film is 150 cm long and its end portion 3a is adjacent the inlet 1b of the channel 1, 1a, the loop 103 hangs downwardly well beyond the surface 2B. The force with which the end portion 3b of the film 3 is clamped between the supporting surface 2A and the adjacent horizontal portion 4a of the clamping device 4 ensures that the weight of the loop 103 does not suffice to extract the end portion 3b from the space immediately above the surface 2A. On the other hand, the force with which the advancing rolls 9, 10 of the means for transporting the film 3 in the channel 1, 1a can move the film in the direction of arrow B or D suffices to ensure that the portion 4a of the clamping device 4 can be lifted above and away from the surface 2A so that the end portion 3b of the film 3 is unclamped and can be pulled toward the inlet 1b.

The clamping device 4 is a lever which extends through an elongated slot-shaped opening 2a (FIG. 3) of the platform 2 and can be pivoted by a reversible electric, pneumatic or other suitable motor 5. The pivot axis for the lever 4 is located at a level below the platform 2, and this lever further includes a second portion 4b extending through the opening 2a, and a third portion 4c which is inclined with reference to the portion 4b and connects the latter with one end of the portion 4a. The portion 4b of the lever 4 is affixed to and extends at right angles from the output shaft 5a of the motor 5. The portion 4a of the lever 4 is parallel to the output shaft 5a.

The motor 5 is designed to pivot the lever 4 between the position which is shown by solid lines in each of FIGS. 1 to 3 (and in which the portion 4a bears upon the end portion 3b of the film 3 while the end portion 3b overlies the supporting surface 2A), and a second position which is indicated by broken lines and in which the portion 4a is located at a level above and adjacent the inlet 1b. The portion 4a is then out of the way so that it cannot interfere with convenient introduction of end portion 3a into and beyond the inlet 1b of the channel 1, 1a.

The operation of the apparatus which is shown in FIGS. 1 to 3 is as follows:

The web 3 is assumed to be an exposed and developed photographic roll film having a length of approximately 150 cm and a total of 36 film frames. The channel 1, 1a is assumed to be installed in a copying machine of the type disclosed by Nitsch et al. and serves to replace one of the magazines which are used in the patented machine to receive rolls of convoluted photographic film. The apparatus is used to advance the film 3 past a monitoring station of the type disclosed by Nitsch et al. and serving to ascertain one or more variable parameters of successive film frames and/or other portions of the film in order to ensure proper copying of film frames onto photographic paper or other photosensitive material during movement of the film 3 in the direction of arrow D. The supporting surface 2A is assumed to be located at a standard level (approximately 80 cm) above the floor beneath the copying machine.

In the absence of the platform 2 and clamping device (lever) 4, the end portion 3b of the film 3 would rest on the floor, together with a substantial part of median portion of the film, on introduction of end portion 3a into the inlet 1b and into the nip of the advancing rolls 9, 10. This could result in contamination of and/or other and perhaps much more serious damage (e.g., scratching) to the film.

In the first step, the operator in charge places the end portion 3b of the film 3 onto the supporting surface 2A of the platform 2 and introduces the end portion 3a into and beyond the inlet 1b. The end portion 3a causes the photocell 8 to generate a signal which is used to immediately or shortly thereafter start the motor 109a as well as to start the motor 5 so that the output shaft 5a pivots the lever 4 from the broken-line position to the solid-line position whereby the portion 4a of the lever 4 cooperates with the surface 2A to clamp the end portion 3b of the film. The median portion of the film then forms a large loop 103 which can hang along the surface 2B but the bight of the loop 103 is incapable of reaching the floor since the overall length of the film 3 is less than twice the distance from the floor to the supporting surface 2A. The person in charge must exercise care during insertion of the end portion 3a into the inlet 1b to ensure that the median portion which forms the loop 103 is not twisted.

Once the motor 109a is set in motion, the advancing rolls 9 and 10 cooperate to advance the film 3 in the passage of the channel 1, 1a toward and past the copying station (which is inactive), and more specifically toward and past the aforementioned monitoring station in the machine of Nitsch et al. so that the monitoring means can gather and memorize all such data which are necessary for proper copying of the images of successive film frames during return movement of the end portion 3a toward the inlet 1b. It is clear that introduction of the end portion 3a of film 3 involves advancement of the leader of film beyond the inlet 1b, namely beyond the aperture 1c and into the nip of the rolls 9, 10.

As the rolls 9, 10 continue to advance the leader 3a away from the inlet 1b, the size of the loop 103 decreases accordingly and the film is ultimately tightened in the region between the inlet 1b and the supporting surface 2A so that the end portion 3b is partially draped around and lifts the portion 4a of the lever 4 to an extent which is necessary to permit extraction of end portion 3b which is then free to move toward the inlet 1b. When the end portion 3b advances beyond the inlet 1b (i.e., into the channel 1, 1a) and beyond the aperture 1c, the photocell 8 generates a signal denoting the absence of film beneath the aperture 1c whereby the transducer of the photocell 8 initiates a stoppage of the motor 109a. Thus, the film 3 is arrested (for example, with a delay which suffices to ensure that the leftmost film frame has advanced into the range of the aforementioned monitoring means). All that counts is to ensure that the end portion 3b of the film 3 is arrested in a position in which the monitoring of the entire film 3 is completed and the film is ready for copying of the images of its film frames. The monitoring device transmits signals to a memory which, in turn, transmits signals to the copying instrumentalities when the direction of rotation of the shaft 9a by the motor 109a is reversed so that the rolls 9, 10 begin to advance the end portion 3b (this end portion then constitutes the leader of the monitored film 3) toward and beyond the inlet 1b. As the end portion 3b advances from the nip of the rolls 9, 10 toward the inlet 1b, it moves beneath the aperture 1c so that the transducer 8b of the photocell 8 transmits a signal which initiates a movement of the lever 4 from the solid-line position to the broken-line position. When the end portion 3b emerges from the inlet 1b, it can tend to move along a straight path to the left of the inlet 1b or exhibits a tendency to curl upwardly (as indicated in FIG. 2 by broken lines at 3b'). However, the portion 4a of the lever 4 is then in a (broken-line) position in which the upwardly curling end portion 3b of the film 3 cannot penetrate between the cover 1a and the lever portion 4a. The signal from the transducer 8b of the photocell 8 (or the signal from a detector which is positioned to detect the upwardly curling end portion 3b in the position 3b') is used to initiate a return movement of the lever 4 (by way of the motor 5) to the solid-line position whereby the portion 4a of the lever 4 cooperates with the platform 2 to urge the end portion 3b of the film 3 against the supporting surface 2A (note FIG. 2) so that further movement of the film in the direction of arrow D results in the formation of a loop 103 which can hang freely along the surface 2B toward but short of the floor. At any rate, the timing of return movement of the lever 4 and the speed of return movement to its solid-line position are selected in such a way that the portion 4a of the lever 4 invariably clamps the end portion 3b of the film 3 against the supporting surface 2A of the platform 2.

The growing loop 103 of the film 3 which is shown in FIG. 2 is prevented from reaching the floor below the platform 2 because the photocell 8 arrests the motor 109a for the shaft 9a when the end portion 3a of the film 3 advances beyond the aperture 1c (toward but short of the inlet 1b) and because friction between the end portion 3a and the parts of section 1 and cover 1a in the region between the inlet 1b and the aperture 1c suffices to ensure that the end portion 3a cannot leave the channel 1, 1a unless it is intentionally extracted by way of the inlet 1b. As a rule, the end portion 3a ceases to advance toward the inlet 1b as soon as its rearmost part advances beyond the nip of the rolls 9 and 10, i.e., it is not even necessary to rely upon the photocell 8 in order to stop the motor 109a. Friction between the end portion 3a and the channel 1, 1a in the region between the rolls 9, 10 and the inlet 1b suffices to ensure that the end portion 3a cannot be extracted from the channel under the weight of the loop 103.

When the end portion 3a comes to a halt, the operator extracts this end portion from the channel and also extracts the end portion 3b from between the lever portion 4a and supporting surface 2A so that the film 3 is ready for further processing, e.g., for cutting up into strips each of which contains two, four, six or more film frames which are to be returned to the customer.

Figures 4, 4A:
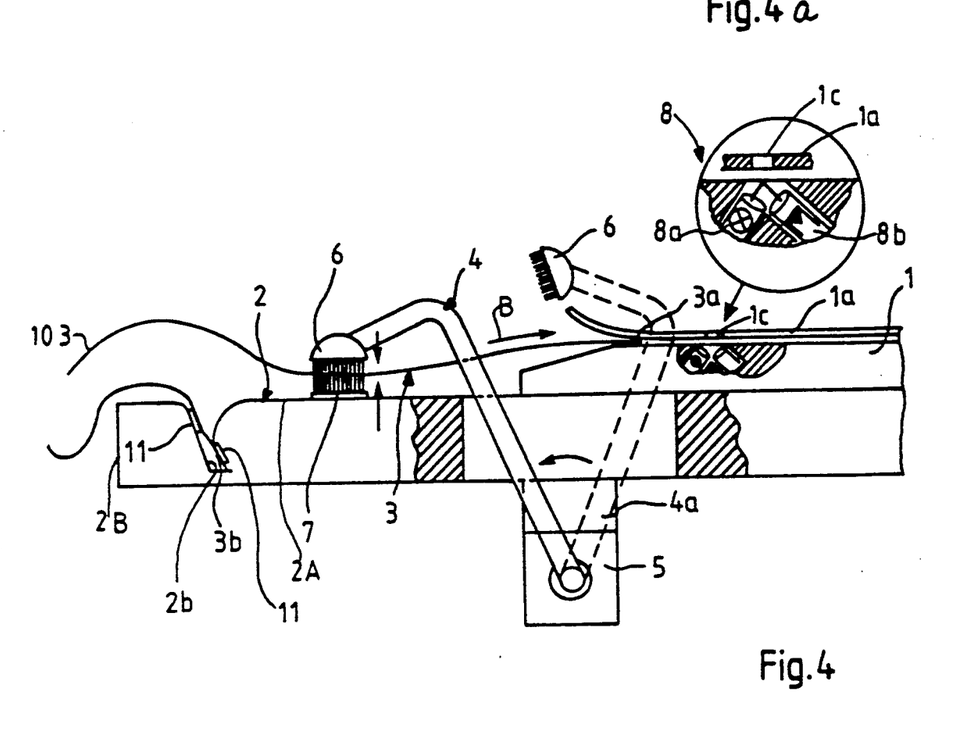
FIG. 4 is a fragmentary partly elevational and partly longitudinal vertical sectional view of a second apparatus which is equipped with means for cleaning the web during transport into the channel.
FIG. 4a is an enlarged sectional view of a detail in FIG. 4.
Figure 5:
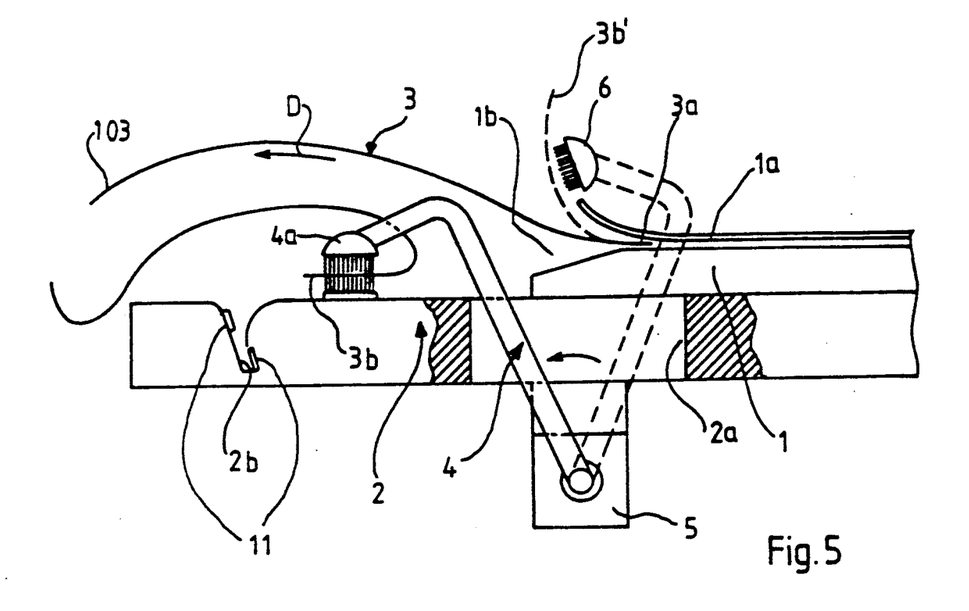
FIG. 5 shows the structure of FIG. 4 but with the web in the process of forming a growing loop between the inlet of the channel and the clamping means.

FIGS. 4 and 5 show a portion of a second apparatus wherein the clamping device 4 performs an additional function, namely of carrying a first cleaning element in the form of a brush 6 which can engage one side of the web (e.g., film) 3, between the end portion 3b and the inlet 1b of the channel including the lower section 1 and cover 1a. All such parts of the apparatus of FIGS. 4 and 5 which are identical with or clearly analogous to corresponding parts of the apparatus of FIGS. 1 to 3 are denoted by similar reference characters. The tips of the bristles forming part of the brush 6 are located in a plane which is parallel to the plane of the film portion between the portion 4a of the lever 4 and the supporting surface 2A when the lever 4 assumes the solid-line position of FIGS. 4 and 5. The same applies for the tips of bristles forming part of a second cleaning element or brush 7 which is mounted on the platform 2 above the supporting surface 2A and serves to wipe the underside of the film 3 beneath the brush 6. The brush 7 is installed opposite the brush 6 (when the latter is caused to assume its solid-line position). Brushes which have filaments made of goat's hair or carbon filaments are particularly suitable for use in the apparatus of FIGS. 4 and 5. However, it is equally possible to employ certain other types of bristles which can wipe the respective sides of the film 3 without scratching and/or other damage. It is desirable to use brushes having bristles which conduct electric current so as to eliminate static electric charges. Such charges can be eliminated, or their intensity can be reduced, by blowing ionized air against the cleaning elements 6, 7 and/or by increasing the moisture content of air around the brushes.

The apparatus of FIGS. 4 and 5 further comprises a gripping device including a recess 2b which is provided in the platform 2 adjacent the surface 2B, and means for frictionally engaging the end portion 3b of the film 3 upon insertion into the recess 2b. The means for frictionally engaging the end portion 3b comprises cushions or pads 11 of soft rubber or another material having a high coefficient of friction and being capable of maintaining the end portion 3b in the recess 2b even at a time when a loop 103 of maximum size hangs freely along the surface 2B of the platform 2. The locations for application of pads 11 to portions of surfaces bounding the recess 2b and the depth of the recess 2b are selected in such a way that frictional engagement between the pads 11 and the end portion 3b in the recess 2b suffices to prevent unintentional extraction of the end portion 3b from the recess, such as under the weight of the loop 103. Soft rubber 11 is a presently preferred material for the making of pads 11 because its coefficient of friction with the material of a photographic roll film is high.

The mode of operation of the apparatus of FIGS. 4 and 5 is analogous to that of the apparatus of FIGS. 1 to 3 except that the material of the loop 103 is free to slide between the brushes 6 and 7 when the advancing rolls (not shown in FIGS. 4 and 5) are driven to transport the film 3 in the direction of arrow B. The end portion 3a of the film 3 is preferably introduced into and beyond the inlet 1b of the channel 1, 1a after it has been caused to pass between the brushes 6 and 7 of the means for cleaning the film. At such time, the brush 6 can be located in the broken-line position at a level above the upwardly sloping left-hand end portion of the cover 1a. The bristles of the brushes 6 and 7 wipe dust and/or other impurities off the respective sides of the median portion of the film 3 while the end portion 3a advances in the direction of arrow B and the brush 6 is maintained in the solid-line position. The lever 4 is caused to move the brush 6 to the broken-line position as soon as the end portion 3b is extracted from the recess 2b and advances beyond the inlet 1b and beyond the aperture 1c for the beam of radiation from the radiation source 8a of the photocell 8. The photocell 8 causes the lever 4 to return to the solid-line position of FIGS. 4 and 5 when the end portion 3b is expelled from the passage of the channel 1, 1a and has advanced beyond the inlet 1b to an extent which is necessary to ensure that the bristles of the brushes 6, 7 will engage the film 3 to the right of the end portion 3b. Such end portion may but need not be reinserted into the recess 2b since the force which is generated by the brushes 6, 7 is 3b between these brushes is capable of resisting the weight of the growing or fully grown loop 103 which develops as a result of movement of the film 3 in the direction of arrow D shown in FIG. 5. In other words, the brushes 6 and 7 serve to clean the film 3 during movement of the leader (end portion) 3a in the direction of arrow B, and these brushes perform the function of the supporting surface 2A and lever portion 4a in the apparatus of FIGS. 1 to 3 during movement of the end portion (trailing end) 3a in the direction of arrow D.

The apparatus of FIGS. 1–3 or 4–5 can be combined with a similar apparatus to operate in such a way that one of the apparatus serves to move the film 3 in the direction of arrow B and the other apparatus serves to move the film in the direction of arrow D. If such twin apparatus are incorporated in the copying machine of Nitsch et al., they can replace the two magazines for rolls of convoluted film. One of the apparatus then serves to advance successive increments of the film through the monitoring station, and the other apparatus then serves to advance successive film frames into register with the copying station.

An important advantage of the improved apparatus is that both end portions of the film 3 are reliably held to ensure that the film develops a loop between the two end portions. This greatly reduces the likelihood, or actually eliminates the possibility, of permitting the film to contact the floor and to be contaminated and/or otherwise adversely affected during introduction into or during evacuation from a copying machine.

Another important advantage of the improved apparatus is that the film is not likely to be scratched and/or otherwise damaged during making of the loop 103 and-/or during a reduction of the size of the loop. At such time, the material of the loop simply overlies the supporting surface 2A in a direction toward the surface 2B, and the loop thereupon continues to grow while hanging downwardly so that the film need not slide relative to the surface 2A and/or 2B.

Further important advantages of the improved apparatus are its simplicity as well as compactness and low cost. Compactness is attributable to the feature that the supporting surface 2A can be placed close to the inlet 1b of the channel 1, 1a. The controls of the improved apparatus are also simple and inexpensive. Thus, a single photoelectronic detector (photocell 8) suffices to regulate the operation of the motors 109a and 5 in proper sequence and at desired intervals.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art and, therefore, such adaptations should and are intended to be comprehended within the meaning and range of equivalence of the appended claims.

What is claimed is:

1. Apparatus for manipulating a web consisting of a finite length of flexible material having first and second end portions, such as a photographic roll film in a copying machine, comprising a channel having an inlet and including means for frictionally holding the web on introduction of one end portion of the web into the channel by way of said inlet; means for supporting the web adjacent said inlet; means for releasably clamping the web to said supporting means, including a lever and means for pivoting said lever to and from engagement with the web on said supporting means; and means for transporting the web longitudinally, including means for looping the web between said inlet and the other end portion of the web.

2. Apparatus for manipulating a web consisting of a finite length of flexible material having first and second end portions, such as a photographic roll film in a copying machine, comprising a channel having an inlet and including means for frictionally holding the web on introduction of one end portion of the web into the channel by way of said inlet; means for supporting the web adjacent said inlet; means for releasably clamping the web to said supporting means; and means for transporting the web longitudinally, including means for looping the web between said inlet and the other end portion of the web, said supporting means having a first surface cooperating with said clamping means to engage the web adjacent said inlet and a downwardly extending second surface adjacent said first surface and facing away from said inlet to provide room for the formation of a downwardly hanging loop in response to transport of the one end portion of the web in said channel toward said inlet.

3. The apparatus of claim 2, wherein said transporting means includes advancing rolls defining a nip for the web in said channel adjacent said inlet.

4. Apparatus for manipulating a web consisting of a finite length of flexible material having first and second end portions, such as a photographic roll film in a copying machine, comprising a channel having an inlet and including means for frictionally holding the web on introduction of one end portion of the web into the channel by way of said inlet; means for supporting the web adjacent said inlet; means for releasably clamping the web to said supporting means, said clamping means being mounted for movement away from said supporting means to provide room for manual placing of the web, particularly the other end portion of the web, onto said supporting means; and means for looping the web between said inlet and the other end portion of the web.

5. Apparatus for manipulating a web consisting of a finite length of flexible material having first and second end portions, such as a photographic roll film in a copying machine, comprising a channel having an inlet and including means for frictionally holding the web on introduction of one end portion of the web into the channel by way of said inlet; means for supporting the web adjacent said inlet; means for releasably clamping the web to said supporting means, means for transporting the web longitudinally, including means for looping the web between said inlet and the other end portion of the web and means for advancing the one end portion of the web in said channel toward and away from the inlet; means for monitoring the web during advancement of the one end portion away from said inlet; and means for imaging the web during advancement of the one end portion toward said inlet.

6. The apparatus of claim 5, wherein said transporting means includes means for advancing the one end portion of the web in said channel toward said inlet in stepwise fashion.

7. Apparatus for manipulating a web consisting of a finite length of flexible material having first and second end portions, such as a photographic roll film in a copying machine, comprising a channel having an inlet and including means for frictionally holding the web on introduction of one end portion of the web into the channel by way of said inlet; means for supporting the web adjacent said inlet; said supporting means having a substantially horizontal supporting surface for the web; means for releasably clamping the web to said supporting means, said clamping means including a lever pivotable about an axis which is located beneath said surface and said lever including a portion arranged to overlie the web on said surface; and means for transporting the web longitudinally, including means for looping the web between said inlet and the other end portion of the web.

8. The apparatus of claim 7, wherein said lever is pivotable between a first position in which said portion thereof engages the web on said surface and a second position in which said portion thereof is located at a level above said inlet.

9. The apparatus of claim 8, further comprising means for pivoting the lever between said first and second positions.

10. The apparatus of claim 9, further comprising means for monitoring the channel for the presence and absence of the web in the channel adjacent said inlet, including means for moving said lever to said second position by way of said pivoting means in response to insertion of the one end portion of the web into said channel by way of said inlet and for moving said lever to said first position in response to withdrawal of the web from said channel by way of said inlet.

11. Apparatus for manipulating a web consisting of a finite length of flexible material having first and second end portions, such as a photographic roll film in a copying machine, comprising a channel having an inlet and including means for frictionally holding the web on introduction of one end portion of the web into the channel by way of said inlet; means for supporting the web adjacent said inlet; means for releasably clamping the web to said supporting means; means for transporting the web longitudinally, including means for looping the web between said inlet and the other end portion of the web; and web cleaning means including a web cleaning element provided on said clamping means and arranged to wipe one side of the web in response to advancement of the web into said channel and the resulting movement of the looped portion of the web between said clamping means and said supporting means.

12. The apparatus of claim 11, wherein said cleaning means includes a second cleaning element provided on said supporting means opposite the cleaning element on said clamping means and arranged to wipe the other side of the web in response to advancement of the web into said channel.

13. The apparatus of claim 12, wherein at least one of said cleaning elements comprises a brush.

14. The apparatus of claim 11, further comprising a gripping device having means for receiving the other end portion of the web, the web extending from said receiving means, between said supporting and clamping means and into the inlet of said channel.

15. The apparatus of claim 14, wherein said receiving means includes a recess for the other end portion of the web and means for frictionally engaging the other end portion of the web in said recess with a force which can be overcome by said transporting means in response to exertion of a pull upon the other end portion of the web in a direction to advance the other end portion toward said clamping means subsequent to introduction of looped portion of the web into said channel.

16. The apparatus of claim 14, wherein said receiving means includes a recess for the other end portion of the web and means for frictionally engaging the other end portion in the recess with a force which suffices to prevent the weight of the looped portion of the web from extracting the other end portion of the web from the recess.

17. The apparatus of claim 14, wherein said receiving means includes a recess and means for frictionally engaging the other end portion of the web in said recess, said engaging means having a high coefficient of friction.

18. The apparatus of claim 17, wherein said engaging means consists of or contains rubber.

19. A method of manipulating a web of photographic roll film of finite length having first and second end portions, comprising the steps of releasably holding one end portion of the film; moving the other end portion of the film close to the one end portion so that the film is looped between the end portions; advancing the first end portion of the film in a direction away from the second end portion to reduce the size of the loop between the end portions; and wiping at least one side of the film between the end portions during said reduction of the size of the looped potion of the film.

20. A method of manipulating a web of photographic roll film of finite length having first and second end portions, comprising the steps of releasably holding one end portion of the film; moving the other end portion of the film close to the one end portion so that the film is looped between the end portions; advancing the first end portion of the film in a direction away from the second end portion to reduce the size of the loop between the end portions; and advancing the first end portion to thus increase the size of the looped portion.

21. The method of claim 20, further comprising the steps of monitoring the film between the first and second end portions in the course of one of said advancing steps, and copying the film between the first and second end portions in the course of the other of said advancing steps.

* * * * *